US006693784B1

(12) United States Patent
Zansky et al.

(10) Patent No.: US 6,693,784 B1
(45) Date of Patent: Feb. 17, 2004

(54) ACTIVE POWER SUPPLY TRANSIENT LIMITER CIRCUIT

(75) Inventors: Zoltan Zansky, San Carlos, CA (US); Bill Jacobsen, Sunnyvale, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

(21) Appl. No.: 10/252,190

(22) Filed: Sep. 23, 2002

(51) Int. Cl.[7] .................................................. H02H 3/22
(52) U.S. Cl. .......................................... 361/111; 326/30
(58) Field of Search ........................... 361/88, 90, 91.1, 361/111, 118, 18, 101; 323/284, 274; 363/15, 39, 50, 56; 326/30

(56) References Cited

U.S. PATENT DOCUMENTS 6,331,786 B1 * 12/2001 Whitworth et al. ........... 326/30
6,359,796 B2 * 3/2002 Hartular et al. ............... 363/50

* cited by examiner

*Primary Examiner*—Gregory J. Toatley, Jr.
*Assistant Examiner*—Boris Benenson
(74) *Attorney, Agent, or Firm*—Suiter West PC LLO

(57) ABSTRACT

The present invention is a method and system for actively limiting transient voltages across a voltage bus. Circuitry coupled to a bus may adjust the voltage level of a bus to a voltage within a desired range when transient voltages cause the voltage level on the bus to fall outside of a desired range. Circuitry of the present invention may include active elements that may adjust a voltage level of a bus in a rapid fashion. Additionally, use of the circuitry of the present invention reduces the cost and design limitations associated with stabilizing buses by solely using multiple low ESR/ESL capacitors.

20 Claims, 4 Drawing Sheets

ACTIVE POWER SUPPLY TRANSIENT LIMITER CIRCUIT

FIELD OF THE INVENTION

The present invention generally relates to the field of voltage regulation, and more particularly to a method and system for actively limiting transient voltages.

BACKGROUND OF THE INVENTION

Modern high speed, high current drawing microcircuits such as processors, integrated memory circuits and peripheral interface circuits require a stable voltage for optimal performance. When multiple devices and circuits require a voltage supply, a bus is utilized which delivers a voltage generated by a conventional power supply. Microcircuits such as peripheral component interface (PCI) cards generate noise on the voltage bus. Power supplies are unable to react quickly enough to hold the voltage level of the bus within a desired range due to significant resistive and inductive parasitic elements between a power supply output capacitor and the microcircuits receiving an input voltage from the power supply.

In order to provide a stable voltage, the power noise sources may require isolation. Conventionally, buses have employed low equivalent series resistance (ESR) and low equivalent series inductance (ESL) capacitors near the control voltage inputs of the respective devices and circuits to attenuate voltage transients to an acceptable level. However, low ESR/ESL capacitors are passive elements that operate more slowly at limiting transients and limiting precision of a desirable voltage range. Low ESR/ESL capacitors must be placed close to the control voltage inputs of the microcircuits which causes additional design limitations. Additionally, low ESR/ESL capacitors are expensive and add significant cost to the voltage bus supplying microcircuits. Consequently, a method and system for actively limiting transients is necessary.

SUMMARY OF THE INVENTION

Accordingly, the present invention is directed to a method and system for actively limiting transient voltages across a voltage bus. In an embodiment of the invention, circuitry coupled to a bus may adjust a voltage level of a bus to a voltage within a desired range when transient voltages cause the voltage level on the bus to fall outside of a desired range. Circuitry of the present invention may include active elements that may adjust a voltage level of a bus in a rapid fashion to ensure devices coupled to the bus operate optimally while reducing the cost and design limitations of low ESR/ESL capacitors.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
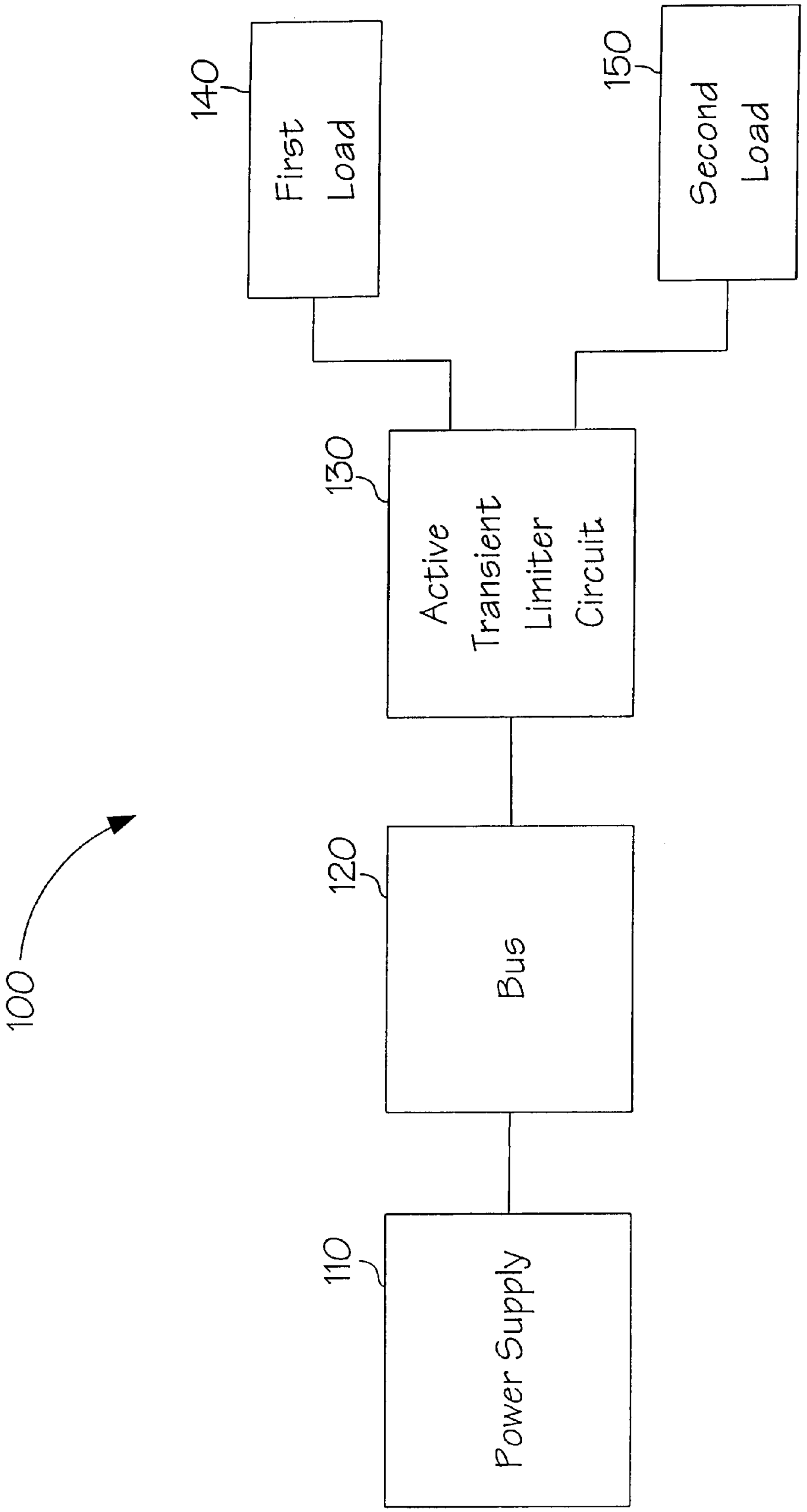
FIG. 1 depicts a block diagram of a power supply system in accordance with an embodiment of the present invention.

Referring to FIG. 1, a power supply system 100 in accordance with an embodiment of the present invention is shown. In an embodiment of the invention, power supply system 100 may include a power supply 110, a bus 120, an active transient limiter circuit 130, and a first and second loads 140-150. Power supply 110 may produce direct current (DC) power that is supplied to first and second loads 140-150 via bus 120. In an embodiment of the invention, power supply 110 may be a switching power supply that may utilize power semiconductor switches in the on and off switching states.

Active transient limiter circuit 130 may ensure that the supply voltage provided by bus 120 remains within a desired range and accounts for voltage transients. Voltage transients may be momentary distortion in the form of a voltage waveform of relatively short duration. Typically, voltage transients may last for a period of one microsecond to several milliseconds, hence voltage regulation known to the art may not operate at a speed to fast enough to attenuate voltage transients within specified bus voltage limits.

Active transient limiter circuit 130 may provide isolation of the loads 140, 150 coupled to bus 120 and prevent loads from generating noise on the bus 120. Through operation of the active transient limiter circuit 130 of the present invention, the voltage supplied to loads 140, 150 by bus 120 may be between a first voltage slightly higher than a nominal voltage and a second voltage slightly lower than the nominal voltage.

Figure 2:
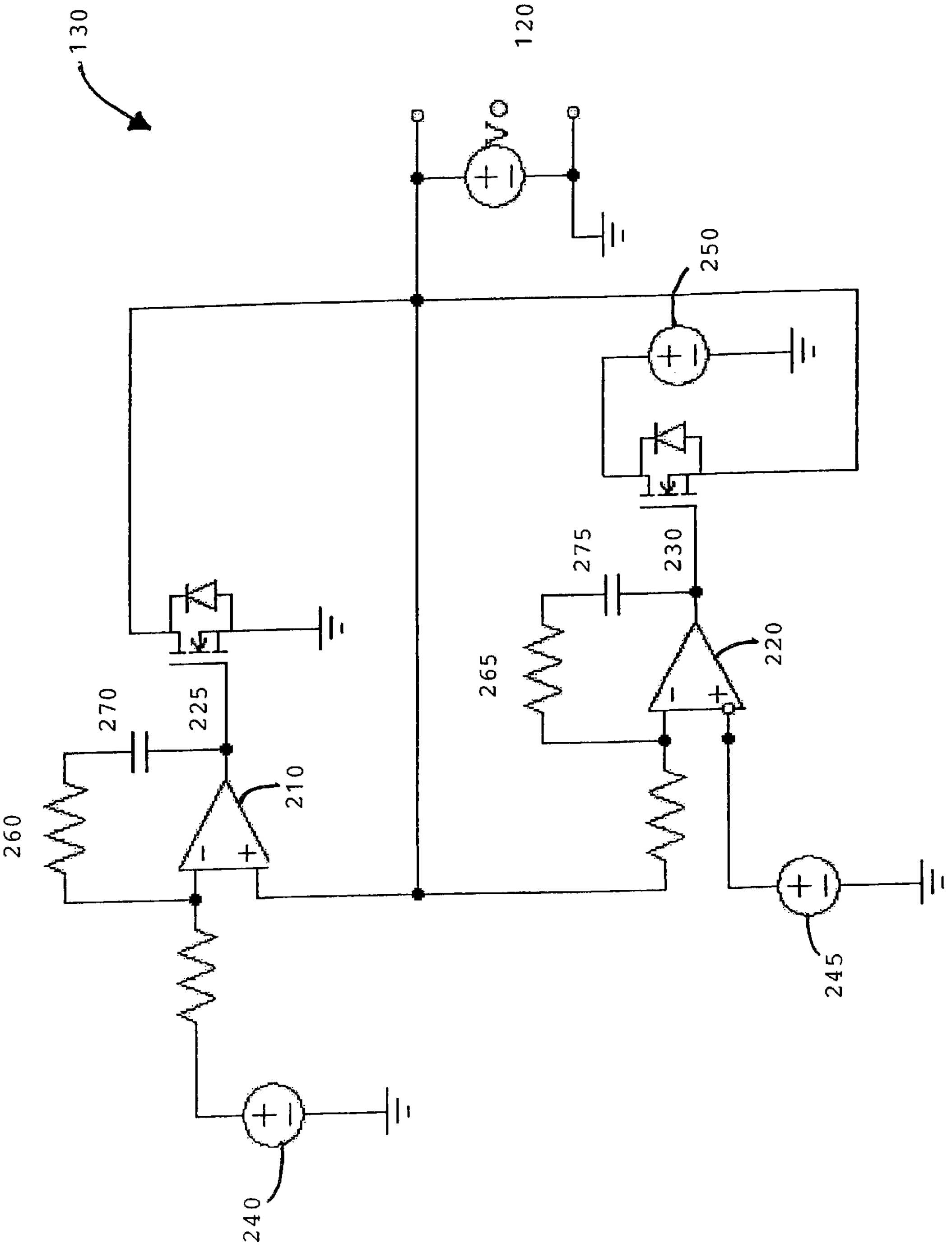
FIG. 2 depicts an active transient limiter circuit in accordance with an embodiment of the present invention.

Referring now to FIG. 2, an active transient limiter circuit 130 in accordance with an embodiment of the present invention is shown. Active transient limiter circuit may include a first operational amplifier 210 and a second operational amplifier 220. In a preferred embodiment, first operational amplifier and second operational amplifier may be high speed operational amplifiers. This may be advantageous as the active transient limiter circuit may operate fast enough to attenuate fast voltage transients. First operational amplifier 210 may drive transistor 225 while second operational amplifier may drive transistor 230. Transistors 225-230 may be low "on-state resistance" metal oxide semiconductor field effect transistors (MOSFETs) in one embodiment of the invention. While transistors 225 and 230 are shown as field effect transistors, it should be understood by those with ordinary skill in the art that other types of transistors may be utilized in accordance with the present invention without departing from the scope and spirit of the present invention.

Active transient limiter circuit 130 may be controlled by two reference voltages: first reference voltage 240 and second reference voltage 245. First reference voltage may be a voltage 240 that is slightly larger than the voltage output of the bus 120 of FIG. 1 (represented by Vo on FIG. 2) while second reference voltage 245 may be a voltage that is slightly less than the voltage output of bus 120. Voltage 250 may be coupled to the transistor 230 and may preferably be a voltage of at least two volts greater than the output voltage of bus 120. First and second reference voltages 240, 245 and voltage 250 may be produced through control voltage inputs, use of voltage dividing circuitry, and the like. Resistors 260, 265 and capacitors 270, 275 may provide a feedback loop compensation for stability of the amplifiers 210, 220.

Turning now to the operation of active transient limiter circuit 130, if the output voltage transient of bus 120 (Vo) should exceed the voltage of first reference voltage 240, first operational amplifier 210 may turn transistor 225 on. This may load the bus 120 so that the transient is limited to a voltage approximately equivalent to the voltage of first reference voltage 240 or to a voltage level less than the voltage of the first voltage reference. If the voltage transient is below the voltage level of second reference voltage 245, second operational amplifier may turn transistor 230 on. This may allow second transistor 230 to pull the voltage level of bus 120 up to approximately the voltage level of second reference voltage 245, or pull the voltage level of the bus 120 greater than the voltage level of the second reference voltage.

In one embodiment of the invention, active transient limiter circuit 130 may limit voltage transients on a bus of a computer system. Voltage transients may be created on a bus by peripheral interface circuits such as peripheral component interconnect (PCI) cards, peripheral component interconnect extended (PCI-X) cards, and memory cards. The active transient limiter circuit 130 of the present invention may limit voltage transients to an acceptable level and may stabilize a bus quicker and at significantly less cost and may occupy less space than passive elements such as low ESR capacitors.

An advantageous aspect of the active transient limiter circuit of the present invention may be the reduction of capacitors needed to limit transients on a bus. The active transient limiter circuit 130 may occupy less space and may be manufactured at a lower cost than utilizing low ESR/ESL capacitors since low ESR/ESL capacitors are expensive. Also, use of the active transient limiter circuit of the present invention may reduce design complexity in power supply systems by eliminating the requirement that a low ESR/ESL capacitor be placed in close proximity to the input voltage of loads coupled to a voltage bus. Another advantage of the active transient limiter circuit of the present invention is the precision of voltage regulation provided by the circuitry 130. The active transient limiter circuit 130 provides a more precise desirable voltage regulation range than what is provided by known passive transient limiter devices like zener diodes and metal oxide varistors.

Figure 3:
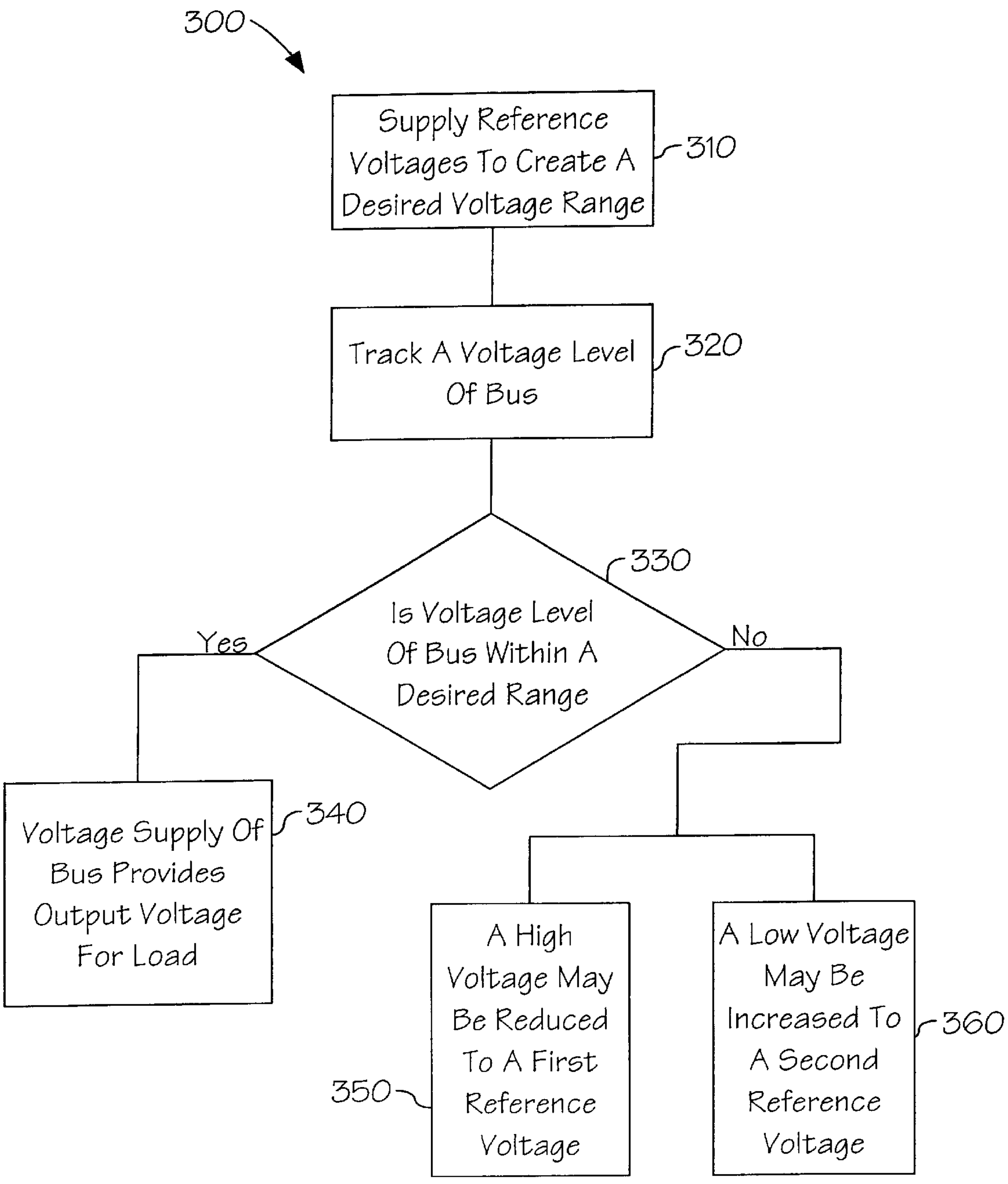
FIG. 3 depicts a process for providing a stable voltage across a voltage bus in accordance with an embodiment of the present invention.

Referring now to FIG. 3, a process 300 for providing a stable voltage across a voltage bus in accordance with an embodiment of the present invention is shown. In one embodiment of the invention, process 300 may be implemented by active transient limiter circuit 130 of FIG. 2. Process 300 may begin by supplying at least two reference voltages to provide a desirable voltage range 310. A first reference voltage may be slightly higher than a voltage level of a desired nominal voltage and a second reference voltage may be slightly lower than a voltage level of the desired nominal voltage.

A voltage level of the output voltage of a bus may be tracked 320. A determination of whether the voltage level of the output voltage is within a desirable range may be completed 330. If the voltage level of the output voltage is within a desirable range, the output voltage of a bus may supply the output voltage 340. If the voltage level of the output voltage of a bus is not within a desirable range, one of the at least two reference voltages may be utilized to supply the output voltage for a load. For example, a high voltage level of an output voltage may be reduced to approximately below or equal to a first reference voltage 350. A low voltage level of an output voltage may be increased to approximately above or equal to a second reference voltage 360.

Figure 4:
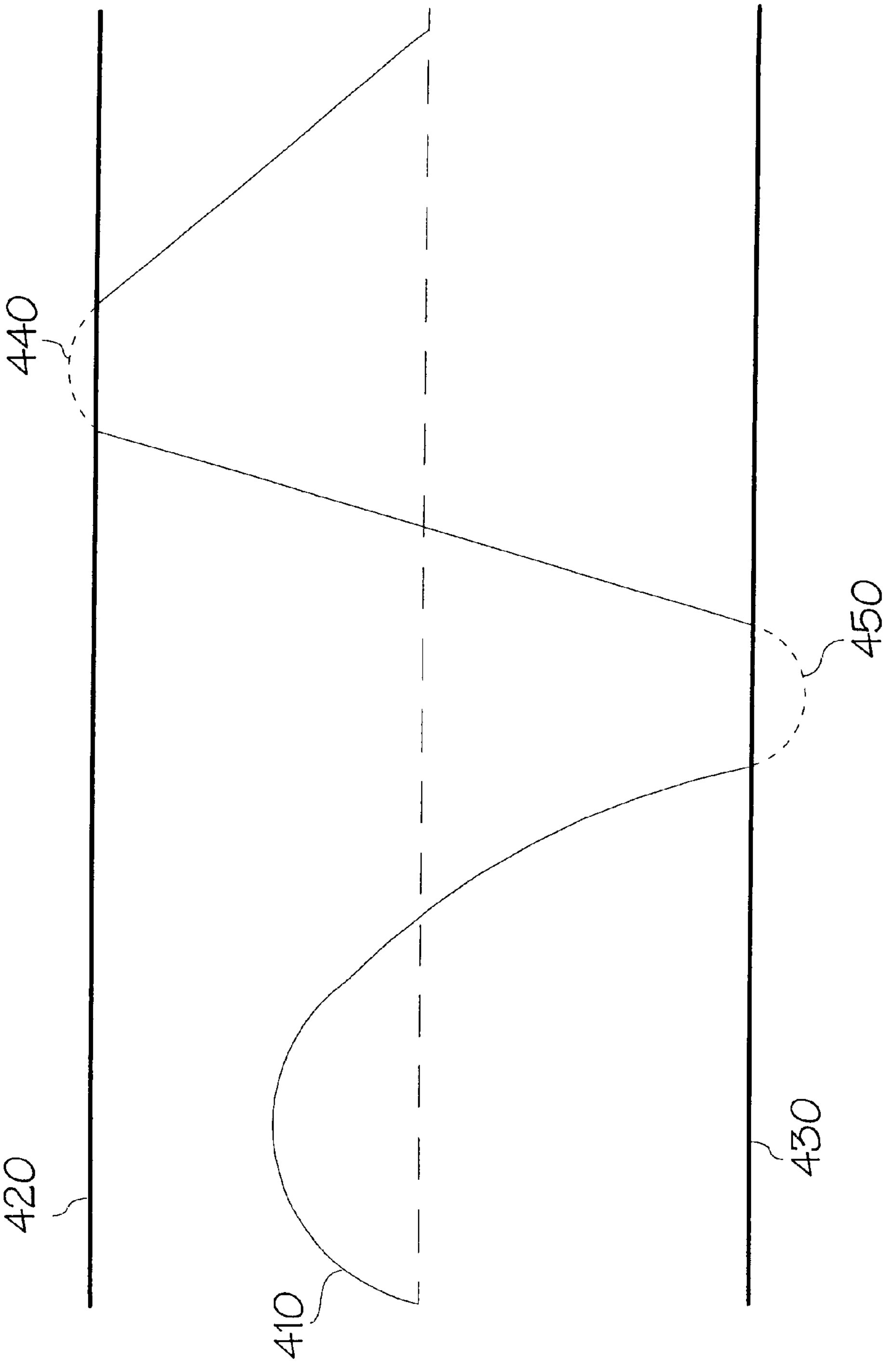
FIG. 4 depicts an exemplary diagram representing the operation of an active transient limiter circuit.

Referring now to FIG. 4, an exemplary diagram representing the operation of the active transient limiter circuit is shown. The voltage 410 may be utilized as an output voltage for a voltage bus when voltage 410 is between a first reference voltage 420 and a second reference voltage 430. When a voltage level 410 is above a first reference voltage level 420, (as shown in peak 440) the voltage of the circuit 130 may be reduced approximately below or equal to the level of the first reference voltage 420. Additionally, when a voltage level 410 is below a second reference voltage level 430, (as shown in valley 450) the output voltage may be increased approximately above or equal to the second reference voltage 430, so the resulting output voltage on the voltage bus is forced to stay between reference voltage 420 and reference voltage 430.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A circuit for limiting voltage transients on a bus to a desirable range, comprising:

(a) at least two reference voltages;

(b) a first and second amplifier; said first amplifier being referenced with a first reference voltage of said at least two reference voltages and said second amplifier being referenced with a second reference voltage of said at least two reference voltage;

(c) a feedback compensation loop for each of said first and second amplifier; and (d) a first and second transistor; said first transistor being driven by said first amplifier and said second transistor being driven by said second amplifier, wherein a voltage of a bus is selected to provide an output voltage when a voltage level of said bus is between said first reference voltage and said second reference voltage.

2. The circuit as claimed in claim 1, wherein a voltage level approximately equal to said first reference voltage is selected to provide the output voltage when said voltage level of said bus is greater than said first reference voltage.

3. The circuit as claimed in claim 1, wherein a voltage level approximately equal to said second reference voltage is selected to provide the output voltage when said voltage level of said bus is less than said second reference voltage.

4. The circuit as claimed in claim 1, wherein said first and second amplifiers are operational amplifiers.

5. The circuit as claimed in claim 1, wherein said first and second transistors are metal oxide semiconductor field effect transistors.

6. The circuit as claimed in claim 2, wherein said voltage level approximately equal to said first reference voltage is selected by said first amplifier turning said first transistor on.

7. The circuit as claimed in claim 3, wherein said voltage level approximately equal to said second reference voltage is selected by said second amplifier turning said second transistor on.

8. The circuit as claimed in claim 1, wherein said output voltage is reduced to a voltage level approximately less than said first reference voltage when said voltage level of said voltage supply is greater than said first reference voltage.

9. The circuit as claimed in claim 1, wherein said output voltage is increased to a voltage level approximately greater than said second reference voltage when said voltage level of said voltage supply is less than said second reference voltage.

10. The circuit as claimed in claim 6, wherein said feedback compensation loop for said first amplifier maintains said voltage level approximately equal to said first reference voltage during an entire duration of a voltage transient on said bus.

11. The circuit as claimed in claim 7, wherein said feedback compensation loop for said second amplifier maintains said voltage level approximately equal to said second reference voltage during an entire duration of a voltage transient on said bus.

12. The circuit as claimed in claim 1, wherein a linear feedback control is employed to prevent a current surge upon a switching of either of said first and second transistor.

13. A circuit for limiting voltage transients on a bus to a desirable range, comprising:

(a) at least two reference voltages;

(b) a first and second operational amplifier; said first amplifier being referenced with a first reference voltage of said at least two reference voltages and said second amplifier being referenced with a second reference voltage of said at least two reference voltage;

(c) a feedback compensation loop for each of said first and second amplifier; and (d) a first and second transistor; said first transistor being driven by said first amplifier and said second transistor being driven by said second amplifier, wherein a voltage of a bus is selected to provide an output voltage when a voltage level of said bus is between said first reference voltage and said second reference voltage, a voltage level approximately equal to said first reference voltage is selected to provide the output voltage when said voltage level of said bus is greater than said first reference voltage, and a voltage level approximately equal to said second reference voltage is selected to provide the output voltage when said voltage level of said bus is less than said second reference voltage.

14. The circuit as claimed in claim 13, wherein said first and second transistors are metal oxide semiconductor field effect transistors.

15. The circuit as claimed in claim 13, wherein said voltage level approximately equal to said first reference voltage is selected by said first amplifier turning said first transistor on.

16. The circuit as claimed in claim 13, wherein said voltage level approximately equal to said second reference voltage is selected by said second amplifier turning said second transistor on.

17. The circuit as claimed in claim 13, wherein said output voltage is reduced to a voltage level approximately less than said first reference voltage when said voltage level of said voltage supply is greater than said first reference voltage.

18. The circuit as claimed in claim 13, wherein said output voltage is increased to a voltage level approximately greater than said second reference voltage when said voltage level of said voltage supply is less than said second reference voltage.

19. The circuit as claimed in claim 13, wherein said feedback compensation loop for said first amplifier maintains said voltage level approximately equal to said first reference voltage during an entire duration of a voltage transient on said bus.

20. The circuit as claimed in claim 13, wherein said feedback compensation loop for said second amplifier maintains said voltage level approximately equal to said second reference voltage during an entire duration of a voltage transient on said bus.

* * * * *